United States Patent [19]

Grasse

[11] Patent Number: 4,598,476
[45] Date of Patent: Jul. 8, 1986

[54] HEAVY DUTY SCRAPER TOOL

[75] Inventor: Palmer Grasse, 1407 Lee Dr., Glendale, Calif. 91201

[73] Assignee: Palmer, Trustee of Grasse Family Trust Grasse, Glendale, Calif.

[21] Appl. No.: 698,836

[22] Filed: Feb. 6, 1985

[51] Int. Cl.$^4$ .............................................. B27G 17/00
[52] U.S. Cl. ....................................... 30/169; 30/344
[58] Field of Search ................ 30/169, 171, 151, 350, 30/170, 344, 340

[56] References Cited

U.S. PATENT DOCUMENTS

| 812,055 | 2/1906 | Linville | 30/170 |
|---|---|---|---|
| 839,994 | 1/1907 | Hase | 30/170 |
| 859,697 | 7/1907 | Shank | 30/170 |
| 890,849 | 6/1908 | Dosch | 30/170 |
| 925,259 | 6/1909 | Ziegler | 30/171 X |
| 962,926 | 6/1910 | Stephens | 30/171 |
| 1,388,931 | 8/1921 | Celler | 30/169 X |
| 1,748,869 | 2/1930 | Drennan | 30/314 |
| 3,387,368 | 6/1968 | Scheck | 30/350 X |
| 3,496,973 | 2/1970 | Ballard | 30/350 X |
| 3,748,736 | 7/1973 | Eisen | 30/151 |
| 3,899,828 | 8/1975 | Bosco | 30/151 |
| 4,071,952 | 2/1978 | Meshulam | 30/151 |

Primary Examiner—Jimmy C. Peters
Attorney, Agent, or Firm—William W. Haefliger

[57] ABSTRACT

A heavy duty scraper tool comprises:
(a) two steel plates extending in parallel relation to clamp a steel scraper blade therebetween, so that the blade projects forwardly from between the plates to present a forward scraping edge,
(b) adjustable fasteners extending between the plates to clamp them toward and against said blade and so that the fasteners can be loosened to permit blade removal and replacement,
(c) a connection integral with one plate and forming a pipe thread,
(d) an elongated metal pipe having a thread at one end thereof and threadably joined to said connection to extend rearwardly relative to said plates,
(e) and a handle carried by the pipe, remotely rearwardly from the plates.

8 Claims, 7 Drawing Figures

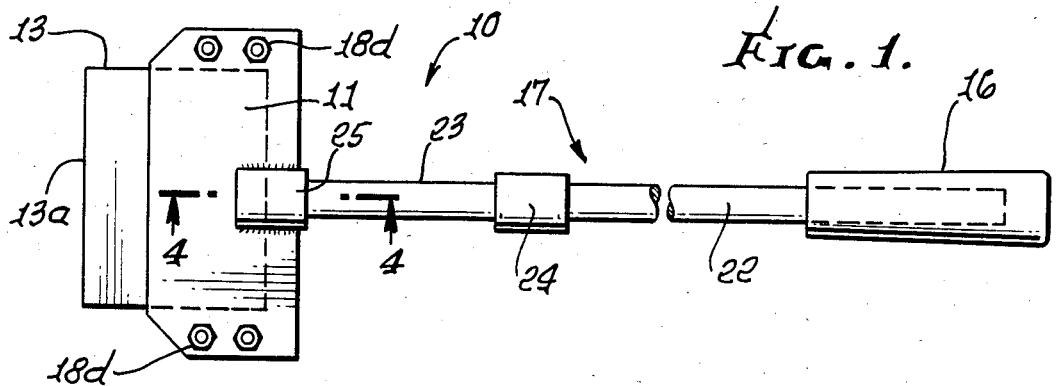
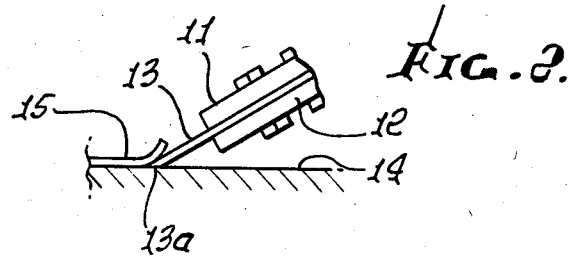
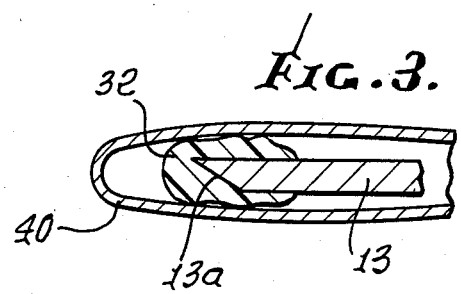
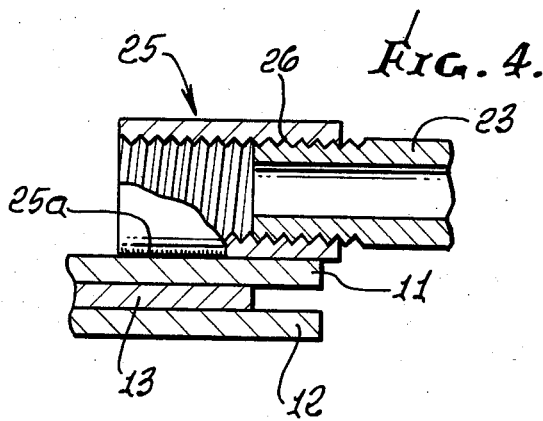
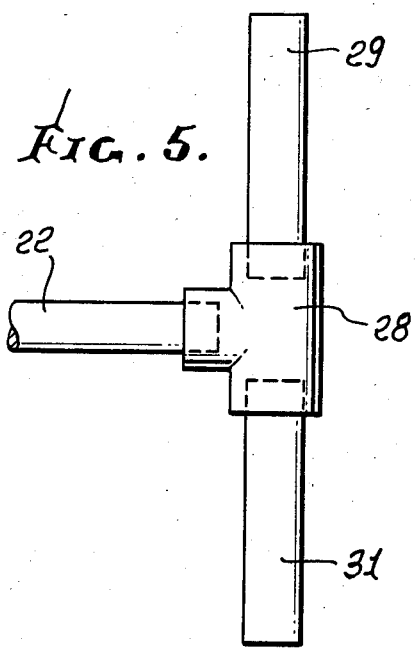
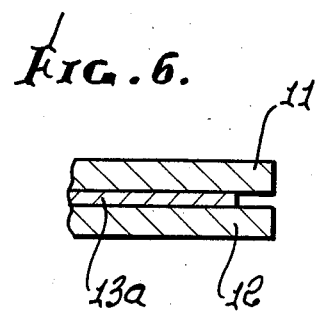
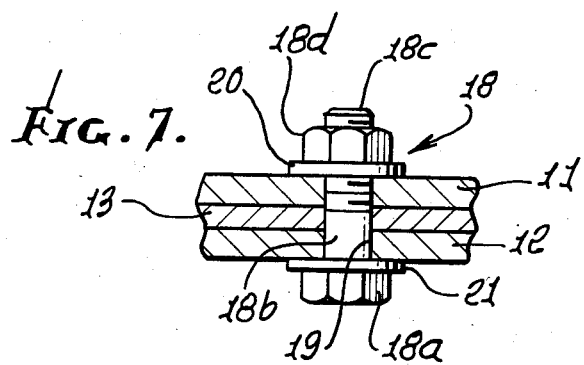

HEAVY DUTY SCRAPER TOOL

BACKGROUND OF THE INVENTION

This invention relates generally to scrapers and more particularly to hand held and controlled scrapers, especially adapted to heavy duty use.

Lightweight hand held scrapers have been built, but are unsatisfactory due to inability to provide sufficient momentum and force application to work. Motor powered scrapers are well known, but they are less versatile since they cannot readily apply scraping force to floor corners and other hand-to-reach areas. There is need for a simple, low-cost heavy duty scraper tool which can easily reach otherwise inaccesible areas, and is easily hand manipulated.

SUMMARY OF THE INVENTION

It is a major object of the invention to provide an improved, heavy duty scraper, meeting the above need.

Basically, the tool comprises (a) two steel plates extending in parallel relation to clamp a steel scraper blade therebetween, so that the blade projects forwardly from between the plates to present a forward scraping edge, (b) adjustable fasteners extending between the plates to clamp them toward and against said blade and so that the fasteners can be loosened to permit blade removal and replacement, (c) a connection integral with one plate and forming a pipe thread, (d) an elongated metal pipe having a thread at one end thereof and threadably joined to said connection to extend rearwardly relative to said plates, (e) and a handle carried by the pipe, remotely rearwardly from the plates.

As will appear, the pipe advantageously comprises multiple sections which have screw threaded means to interconnect same, whereby the operable length of the pipe is adjustable, to add weight to the weight of the plates and blade for enhancing the scraping power of the tool. Typically, the handle may be fitted on the pipe, or may comprise a pipe tee on the pipe and two sidewardly projecting auxiliary pipe sections attached to the tee. The opposite end of the pipe may be thread connected to a plate via a pipe collar welded to a plate.

The fasteners may comprise two pairs of bolts extending through said plates, and bounding the blade located between said bolt pairs; and the blade and its scraping edge may project forwardly from between said plates, and is adjustable forwardly and rearwardly relative to said pairs of fasteners, when the fasteners are loosened.

As is clear, the tool may be completely disassembled, so that its components may fit in a tool box, for transport, The tool may have selected length, i.e. from about 1 to 8 feet, for example.

A further feature is the protection of sharp edges of scraper blades as during shipment and installation, also protecting the user.

These and other objects and advantages of the invention, as well as the details of an illustrative embodiment, will be more fully understood from the following specification and drawings, in which:

FIG. 1 is a plan view of a heavy duty scraper embodying the invention;

FIG. 2 is a fragmentary elevation showing use of the scraper tool;

FIG. 3 is an enlarged section showing protection of the scraper blade;

FIG. 4 is an enlarged section on lines 4—4 of FIG. 1;

FIG. 5 is a plan view showing a modified tool handle;

FIG. 6 is a section showing tool mounting of a thin blade, and

FIG. 7 is a section showing details of tool plate interconnection.

DETAILED DESCRIPTION

In the drawings the tool 10 includes two steel plates 11 and 12 extending in parallel relation to clamp scraper blade 13 therebetween. The steel blade projects forwardly from between the plates, and has a tapered forward scraping edge 13a. FIG. 2 shows the blade applied to a surface 14 to lift a tile or other material 15, as by scraping action, the worker applying manual force to a handle 16 to push the tool. The force and momentum of such scraping is greatly enhanced by the mass of the steel plates and of the pipe 17 connected to the blades, as will appear.

The blades are connected together by two pairs of fasteners 18, which are tightened to clamp the blade between the plates. FIG. 7 shows typical fasteners as including bolt heads 18a, shanks 18b extending through holes 19 in the plates, and threaded ends 18c. Nuts 18d are tightened on ends 18c, and washers 20 and 21 are located as shown. Blades of different sizes and thickness may, accordingly, be fitted between the plates 11 and 12, and shifted forwardly or rearwardly, as described. See in this regard thinner blade 13a in FIG. 6. The heavy mass of the plates transmits force and momentum to the blade during scraping, to assist same.

The handle 16 is connected onto a metal pipe section 22, and the latter may be connected to one or more additional sections 23 to add mass or weight to the scraper, or to lengthen it, i.e. the distance between handle and blades. Such connection is via a threaded coupler 24, to which the sections have threaded connection. Section 23 is also thread connected to a coupler 25 welded at 25a to plate 11, at a rearward, central location. See the thread connection 26 in FIG. 4. Accordingly, the tool may be quickly disassembled, as at the coupler, and by disconnecting the plates, so that all parts fit in a tool box or other carrier.

FIG. 5 shows a pipe tee 28 to which section 22 is connected. Auxiliary short metal pipe sections 29 and 31 are also connected to the tee, to provide sidewardly extending handles, adding mass to the tool. The pipe wall thickness (all sections) may be between 1/16 and 3/16 inch, and its diameter between ⅝ and 1¼ inches.

FIG. 3 shows the blade tapered edge, which is sharp, as being initially protected by a layer 32 of synthetic resin applied to same. The latter quickly wears off the blade as it is applied to the work, during scraping.

The heavy duty tool is very effective in removing tar paper, roofing, tile or other materials from floors, roofs, etc., and particularly in inaccessible areas as near corners, around upstanding fixtures, etc., by virtue of its simplicity, weight or capability for manual manipulation.

FIG. 3 also shows a paper or non-metallic sheet envelope 40 into which the blade 13 is received, for shipment, the hardened plastic material 32 also fitting within the envelope. Accordingly, the blade sharp edge is doubly protected; the user to whom such a replacement blade is shipped is protected as he handles the envelope and removes the blade from the latter; and the user is protected as he installs the blade in the scraper. The resin may be thermo plastic, and applied to the edge as by dipping the edge into a molten bath of the resin. This apsect of the invention is applicable to replaceable blades of scrapers of many types, including those of the powered type shown in U.S. Pat. Nos. 3,376,021; 4,365,843, and 4,365,842; 4,452,492, and 4,483,566.

I claim:

1. In a heavy duty scraper tool, having a steel blade, the combination comprising
   (a) two steel plates extending in parallel relation to clamp said scraper blade therebetween, so that the blade projects forwardly from between the plates to present a forward scraping edge, the blade being rectangular and having forward scraping edge and two laterally spaced forwardly extending edges, the blade having the form of a flat metal sheet,
   (b) adjustable fasteners including two pairs of bolts extending through four holes in the plates between and through the plates to clamp them toward and against said blade and so that the fasteners can be loosened to permit blade removal and replacement, the bolts everywhere spaced from the blade, one pair of bolts located proximate one blade lateral edge, and the other pair of bolts located proximate the other blade lateral edge, the two plates having combined thickness substantially greater than the blade thickness,
   (c) a connection integral with one plate and forming a pipe thread,
   (d) an elongated metal pipe having a thread at one end thereof and threadably joined to said connection to extend rearwardly relative to said plates, said one end of the pipe located proximate said one plate, said pipe extending substantially parallel to the blade,
   (e) and a handle carried by the pipe, remotely rearwardly from the plates.

2. The combination of claim 1 wherein said pipe includes multiple sections which have screw threaded means to interconnect same, whereby the operable length of the pipe is adjustable, to add weight to the weight of the plates and blade for enhancing the scraping power of the tool.

3. The combination of claim 1 wherein the pipe has wall thickness of about 1/16 to 3/16 inch, and the pipe diameter is between 158 to 1¼ inches.

4. The combination of claim 1 wherein said handle comprises a pipe tee attached to the end of the pipe remote from the plates, and auxiliary pipe sections attached to the tee and extending sidewardly.

5. The combination of claim 1 wherein said connection comprises a pipe collar welded to one of the plates.

6. The combination of claim 1 wherein the blade and its edge project forwardly from between said plates, and is adjustable forwardly and rearwardly relative to said pairs of fasteners, when the fasteners are loosened.

7. The combination of claim 1 including synthetic resin applied to the blade edge to protect same.

8. The combination of claim 7 including an envelope receiving the blade and its resin protected edge, prior to installation.

* * * * *